(No Model.) 2 Sheets—Sheet 2.

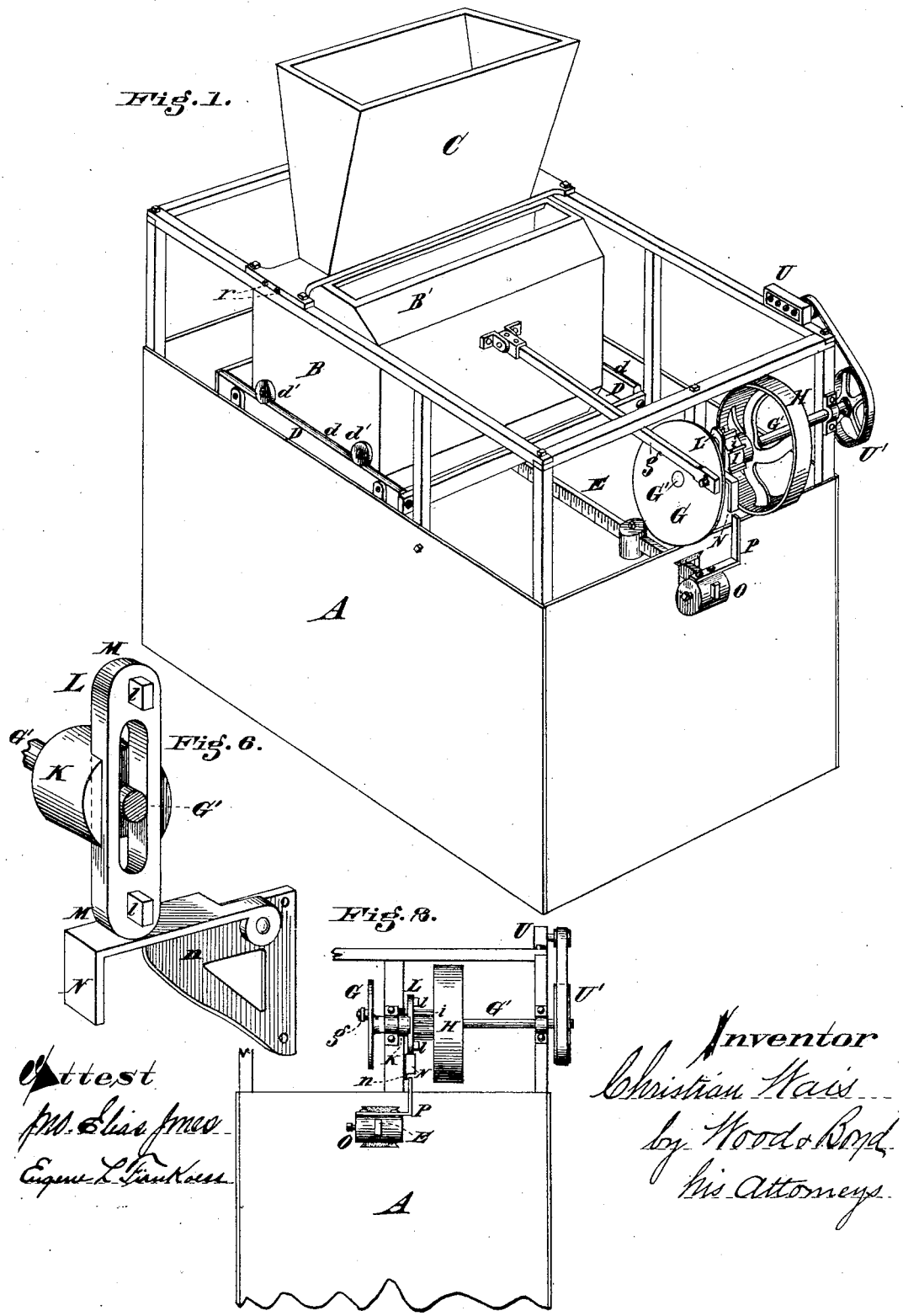

C. WAIS.
AUTOMATIC GRAIN WEIGHER.

No. 244,697. Patented July 19, 1881.

UNITED STATES PATENT OFFICE.

CHRISTIAN WAIS, OF NEWPORT, KENTUCKY, ASSIGNOR TO SIMPSON & GAULT, OF CINCINNATI, OHIO.

AUTOMATIC GRAIN-WEIGHER.

SPECIFICATION forming part of Letters Patent No. 244,697, dated July 19, 1881.

Application filed April 23, 1881. (No model.)

*To all whom it may concern:*

Be it known that I, CHRISTIAN WAIS, a citizen of the United States, and a resident of Newport, in the county of Campbell and State of Kentucky, have invented certain new and useful Improvements in Automatic Weighing Devices, of which the following is a specification.

My invention relates to an improved measuring-scale for weighing and measuring grain, coal, and other articles of commerce.

It consists, chiefly, of a set of reciprocating buckets placed side by side and working on tramways, which are on a balance-frame, which frame is supported on knife-bearings and counterbalanced by a scale beam and weight. The parts are so arranged that when a sufficient weight is put into one of the buckets to raise the counterbalance a trigger operates a clutch which puts in motion a crank and pitman operated by a driving-shaft. The pitman moves one of the buckets out from under the hopper or spout, and, having an open bottom, which is closed when filling by a cut-off plate, moves it from contact therewith and empties one bucket as the other is carried into position for filling. An eccentric is provided to automatically start and stop the operation when any given amount of material is filled into each bucket.

One of the principal features of my invention is the automatic operation by a driving-shaft with two reciprocating buckets mounted upon a balance or scale carriage.

Other features of my invention will be fully set forth in the description of the accompanying drawings, making a part of this specification.

Figure 3:
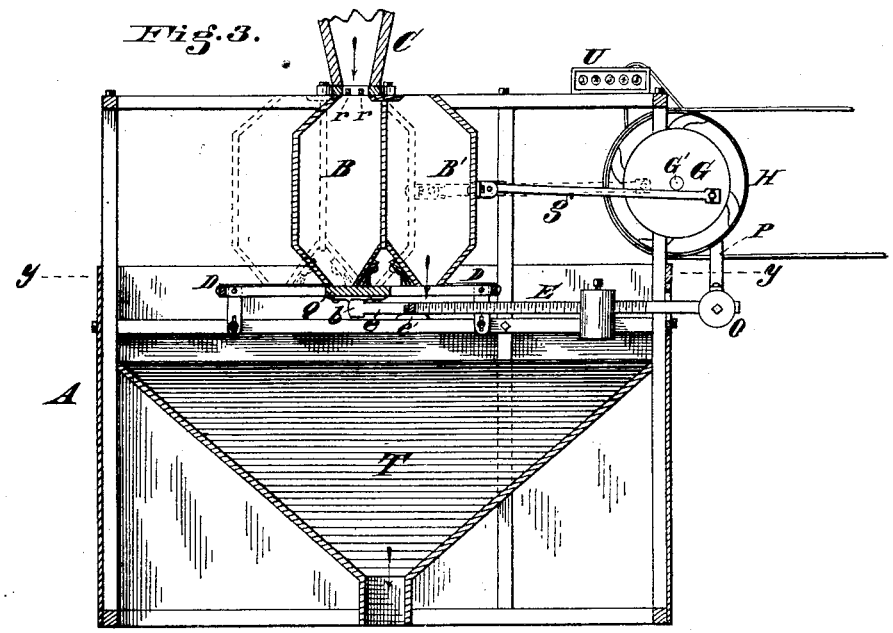
Figure 4:
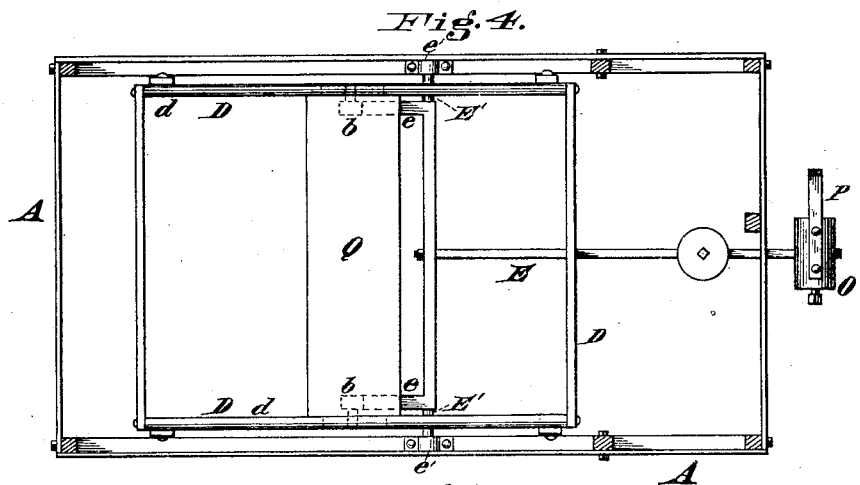
Figure 5:
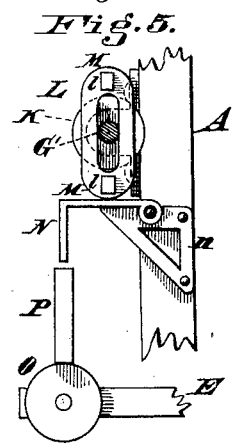

In the accompanying drawings, Figure 1 is a perspective view of my invention. Fig. 2 is a front elevation of Fig. 1. Fig. 3 is a central longitudinal section of Fig. 1. Fig. 4 is a plan view on line $y\ y$, Fig. 3. Fig. 5 is a side elevation of the tripping devices. Fig. 6 is a perspective view of the automatic clutch and tripping devices.

A represents the box or bin into which the article measured is dumped, and forms the frame of the machine.

B B' represent double reciprocating buckets.

C represents the hopper or spout for filling the buckets. The bin or hopper may be made separate from the frame, if desired.

D represents a balance-frame.

$b\ b$ represent pivots.

E represents a scale-beam, which is provided with forked ends $e\ e$. Slots are provided in the ends of these forks through which pivots $b$ pass to suspend frame D and buckets B', which together form, in fact, a scale-hopper. The balance-beam E is supported on a rock-shaft, E', which is journaled in bearings $e'\ e'$.

$d\ d$ represent tramways placed on the top of frame D, outside of the buckets B B', which buckets are provided with friction-rollers $d'$ to facilitate their reciprocation.

G represents a crank-wheel.

$g$ represents a pitman centrally pivoted to the buckets B B'.

G' represents a shaft on which the driving mechanism is mounted.

H represents the driving-pulley, which is adapted to run loosely on the shaft.

I represents a toothed collar rigidly connected with pulley H.

K represents a revolving clutch attached to shaft G' by set-screws or otherwise. This clutch is preferably made of the form shown in Fig. 6.

L represents a clutch-plate, which is preferably made in the form shown in Fig. 6. It is provided with an elongated slot, through which passes the driving-shaft G'. The clutch or collar K is grooved to form a guide for the sliding plate L.

$l$ represents lugs, which alternately engage with the teeth $i$ of the collar I as the clutch-plate L is raised by the pendent arm N and scale-beam E.

M represents rounded ends of the plate L, which alternately throws the clutch out of gear with the wheel I by contact with the arm N as they arrive at the position shown in Fig. 6. The clutch-plate L is raised by the scale-beam E. As the lugs $l$ engage with the teeth $i$ the driving-pulley H revolves the shaft and the pitman is carried forward or backward. As it reaches the end of the stroke the opposite end of plate L, striking the pendent arm N, raises the lug at the top of plate L out of contact with the teeth of wheel I and frees the clutch, when the driving-pulley will run loose on the shaft.

O represents a weight on the balance scale-beam E. It is provided with a set-screw for securing it in any desired position.

P represents a tripping-arm attached to weight O, which as the scale-beam rises strikes arm N and throws the clutch L into gear.

N represents a pendent arm, which is pivoted and supported on bracket $n$ attached to the frame A.

When the bucket B' is empty the parts are in the position shown in Fig. 3. The scale-beam is adjusted so as to rise as soon as one bucket is filled and throw one of the lugs $l$ of clutch-plate L into contact with the toothed wheel I, and the buckets B B' are reciprocated forward, carrying one under the spout and the other over the bin for emptying. The bucket B' in Fig. 3 is represented in position for emptying. The bottoms of the buckets are preferably made hopper-shaped to expedite the discharge. The bottoms of the buckets are open. B in Fig. 3 represents the other bucket in position for filling. The mouth of the bucket rests on a cut-off plate, Q, when it is being filled, and the bucket empties as soon as moved off from this position. The dotted lines show the position of bucket B when emptying.

$r\,r$ represent straight edges in the mouth of hopper C for striking off surplus material from the buckets and preventing it being carried under the edge of the hopper and causing them to bind.

T represents a hopper-shaped bin, into which the material measured is dumped. U represents an indicator for registering the number of times the buckets are dumped. It is driven by pulley or sprocket-wheel U' on shaft G'.

It is obvious that instead of reciprocating the buckets B B', the hopper and plate Q may be reciprocated in lieu thereof, and would be a substantial equivalent for the reciprocation of the buckets.

What I claim as my invention is—

1. The alternate measuring-buckets B B', in combination with the frame D and scale-beam E, and the driving mechanism for automatically reciprocating the buckets in a horizontal plane for emptying and measuring grain or any other articles of commerce, substantially as herein set forth.

2. In a grain-measuring device, the alternate measuring-buckets B B', arranged to reciprocate in a horizontal plane, in combination with a continuous driving-shaft and weighing mechanism, and with the automatic devices for throwing the same in and out of gear, whereby the device may be automatically operated, substantially as herein set forth.

3. In a grain-measuring device, the reciprocating buckets B B', scale frame and beam D E, and the driving-mechanism, in combination with automatic devices which reciprocate the buckets in a horizontal plane and empty and fill the buckets by the operation of the scale-beam and the clutch-mechanism, substantially as herein set forth.

4. In a grain-measuring device, the reciprocating measures B B', suspended on a scale frame and beam D E, in combination with a continuous-revolving shaft having a loose pulley which is alternately connected and disconnected by clutch-mechanism on the driving-shaft by the rise and fall of the scale-beam to automatically reciprocate the measures in a horizontal plane, and a registering device for recording the measurements, substantially as herein set forth.

In testimony whereof I have hereunto set my hand in the presence of two subscribing witnesses.

CHRISTIAN WAIS.

Witnesses:
 JOHN ELIAS JONES,
 EUGENE LINCOLN FIRN KOESS.